United States Patent
Vogler et al.

(10) Patent No.: US 6,231,624 B1
(45) Date of Patent: *May 15, 2001

(54) PROCESS FOR CONTINUOUS DRY GRANULATION OF POWERED CARBON BLACK

(75) Inventors: Conny Vogler, Bornheim; Karl Vogel, Alzenau; Jan Kopietz, Erftstadt, all of (DE)

(73) Assignee: Degussa Huls AG, Frankfurt am Main (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,245

(22) Filed: Jun. 5, 1997

(30) Foreign Application Priority Data

Jun. 11, 1996 (DE) ................................ 196 23 198

(51) Int. Cl.$^7$ ............................ C01B 31/14; B01J 2/00; C09C 1/60
(52) U.S. Cl. ..................... 23/314; 264/117; 425/222
(58) Field of Search ........................ 23/314; 425/222

(56) References Cited

U.S. PATENT DOCUMENTS

| | | | |
|---|---|---|---|
| 2,120,540 | * 6/1938 | Billings et al. | 23/314 |
| 2,131,686 | * 9/1938 | Heller et al. | 23/314 |
| 2,293,439 | * 8/1942 | Lloyd | 425/222 |
| 2,306,698 | * 12/1942 | Heller et al. | 23/314 |
| 2,422,989 | 6/1947 | Skoog | 259/3 |
| 2,758,039 | * 8/1956 | Barbour | 23/314 |
| 2,807,523 | 9/1957 | Wood | 23/314 |
| 2,838,191 | * 3/1958 | Glaxner et al. | 23/314 |
| 3,607,086 | * 9/1971 | Dingus | 23/314 |
| 3,787,161 | * 1/1974 | Frye et al. | 425/222 |
| 3,825,233 | * 7/1974 | Henderson | 425/222 |
| 4,162,287 | 7/1979 | Gunnell et al. | 264/117 |
| 4,222,727 | * 9/1980 | Adachi et al. | 425/222 |

FOREIGN PATENT DOCUMENTS

| | | |
|---|---|---|
| 408615 | 1/1969 | (AU). |
| 859509 | 12/1952 | (DE). |
| 1054617 | 4/1959 | (DE). |
| 0360236 | 3/1990 | (EP). |
| 404452 | 1/1934 | (GB). |

OTHER PUBLICATIONS

In Re Dienot 1386SPQ248 (252) CCPA 1963.*
McKetta et al. Ed, Encyclopedia of Chemical Processing & Design, Marcel Dekker Inc, Wyng, 1978, pp271–223.*

* cited by examiner

Primary Examiner—Gary P. Straub
(74) Attorney, Agent, or Firm—Smith, Gambreli & Russell, LLP (57) ABSTRACT

A process for continuous dry granulation of powdered carbon black. Granulation is performed with the assistance of a granulator. As a result, for comparable sized equipment, the carbon black throughput can be increased several times as compared with pelletizing drums used in the conventional manner.

10 Claims, 3 Drawing Sheets

PROCESS FOR CONTINUOUS DRY GRANULATION OF POWERED CARBON BLACK

INTRODUCTION AND BACKGROUND

The present invention relates to a process for the continuous dry granulation of powdered carbon black.

When processing industrial carbon black, granulated products are preferably used, these often being called carbon black granules, carbon black beads, pelleted or pelletized carbon black.

The individual granules or beads of these carbon black products are spherical. Depending on the particular application, a mean bead diameter $d_{50}$ of from 0.125 to 2.0 mm is desired. Carbon black beads with mean diameters of less than 0.125 mm are referred to in the art as fines and are generally considered undesirable. When using granulated carbon black as a filler for rubber blends and as a pigment for plastics or dyes, the granulated carbon black is substantially well dispersed in the ultimate product. Since the bead hardness and thus also the dispersion hardness in a given granulating process, from experience, depends on the diameter of the carbon black beads, carbon black granular materials with as narrow as possible a bead size distribution curve are desired. Bead size distributions with a ratio $d_{80}/d_{20}$ of less then 9 are desirable.

Two different processes are currently used for granulating carbon black on an industrial scale, namely, wet granulation in a beading machine with a subsequent drying procedure and dry granulation in a pelletizing drum. The two processes have quite different process parameters which are closely related to the physical process involved in the particular agglomeration procedure and the resulting pellet properties.

Granulators with toothed shafts are used as pelletizing machines for wet granulation. In the following, the expressions granulator and toothed shaft granulator are used as alternatives to pelletizing machine. Toothed shaft granulators consist of a fixed drum arranged in a horizontal position (also called a stator herein) with a rotating toothed shaft located therein.

The teeth are pins of a specific diameter and a specific length which are arranged on the toothed shaft, axially offset with respect to each other, along one or more helical lines. The pins are aligned in a radial direction. Their length is such that the distance from the ends of the pins to the internal wall of the stator is normally 2 to 10 mm.

A pelletizing space is provided for granulation between the axis of the toothed shaft and the stator wall. In the pelletizing space the carbon black is transported by the rotating toothed shaft from the inlet at one end of the stator to the exit at the other end of the stator. Agglomeration then takes place due to the carbon black rolling along the stationary stator wall. The residence time of the carbon black in the mixer granulator can be extended by fitting a baffle plate at the exit or by raising the exit with respect to the inlet. Typical pelletizing machines have a length of 1 to 3.5 m and a diameter between 200 and 760 mm.

Inside the pelletizing machine, the powdered industrial carbon black is intensively mixed with water, optionally with the addition of a binder. Depending on the type of carbon black, at water contents of from 40 to 60 wt. %, with reference to the total weight, spherical carbon black pellets are obtained. The moist pellets are then dried in a further process step (DE-AS 1 264 412; U.S. Pat. Nos. 3,607,086; 3,787,161 and 4,222,727).

During wet granulation agglomeration takes place by means of liquid bridges and capillary forces between the carbon black particles. The size of the capillary forces enables comparatively high peripheral speeds of 10 to 20 m/s at the ends of the teeth, wherein intensive blending and subsequent granulation are produced.

The residence time required for effective formation of carbon black pellets is in the region of a few seconds, normally less than 20 seconds, with wet granulation. The residence time can be extended to the region of a few minutes by means of a baffle plate or by raising the exit with respect to the inlet.

The bead hardness which can be produced for carbon black pellets obtained by wet granulation, without using binders, is in the range from 0.1 to 0.3 N for pellet diameters from 1.4 to 1.7 mm. The average bead size ($d_{50}$ value) can be varied from 0.2 to 2.0 mm during wet granulation by appropriate adjustment of the process parameters.

In the case of dry granulation, pelletizing drums are used which also consist of a horizontally arranged rotating tube. The internal space of the tube is called the pelletizing chamber. In order to achieve granulation, powdered industrial carbon black is precompacted in accordance with DE 38 32 404 and granulated in the pelletizing drum by rolling round on the rotating tubular wall. The van der Waals and electrostatic forces responsible for dry granulation are substantially smaller than the capillary forces which act during wet granulation. Accordingly, granulation must be performed more gently. The peripheral speed of the pelletizing drum is therefore only 1 to 2 m/s. If the peripheral speed is much higher than this, the rolling motion does not occur due to the high centrifugal force. Furthermore the effect of the force on the pellets being formed is so large that these immediately disintegrate again. The pellet hardness which can be produced is usually less than 0.1 N for pellet diameters of 1.4 to 1.7 mm. The average pellet size ($d_{50}$ value) with conventional dry granulation is generally in the range from 0.125 to 0.8 mm.

Due to the small van der Waals forces, to initiate granulation it is necessary to add seeding material, in the form of prepelleted carbon black, to the carbon black. The seeding material is added to the pelletizing drum, before the start or continuously during operation of the pelletizing drum, in an amount of 1 to 30 wt. %, with reference to the amount of powdered carbon black. The seeding material ensures that the seeds required for agglomeration are always available in adequate amounts. If seeding material is not added, dry granulation may not take place or the pellets may break up.

The typical residence time for carbon black in a dry pelletizing drum is 1 to 4 hours. In order to ensure sufficient carbon black throughput (in kg/h), dry pelletizing drums have to be substantially larger than pelletizing machines for wet granulation. In production, dry pelletizing drums with diameters of 2 m and lengths of 18 m are used. The filling amount used in these types of drums is several tons. In contrast, the amount of material used in pelletizing machines is only a few kilograms.

Additives to increase the bead hardness and/or to improve dispersibility may be used during both wet and dry granulation.

Wet granulated carbon blacks generally also have a higher dispersion hardness than dry granulated carbon blacks due to their higher bead hardness. They are therefore mainly used in the rubber industry. Wet granulated carbon blacks can be efficiently dispersed in highly viscous rubber materials. Their high bead hardness means that the mixture is easy to transport in pneumatic feeding units.

Dry granulated carbon blacks are mainly used as pigments in lacquers, printing inks and plastic materials. Powdered carbon black is also still used in large amounts in these fields of application, however, and this can lead to extensive dust pollution in the workplace during handling procedures. This dust pollution can be reduced only by using granulated carbon blacks. It is expected that the demand for granulated carbon blacks will increase in the future. This requires considerable investment from carbon black producers due to the size of the plant.

An object of the present invention is to provide a process for dry granulation which facilitates dry granulation with the same throughput as in known dry pelletizing drums in substantially smaller plants or increases the throughput of existing plants and provides a carbon black granular material which is distinguished by a narrow distribution curve for pellet diameters, good dispersibility and the smallest possible amount of fines (pellet diameter <0.125 mm).

SUMMARY OF THE INVENTION

The above and these objects of the invention are achieved by a process for dry granulation of powdered carbon black where the granulation is performed in a toothed shaft granulator which has, in a circular cylindrical, drum-shaped stator with a longitudinal axis, an axially arranged toothed shaft which rotates about the longitudinal axis of the stator and conveys the powdered carbon black from the inlet to the exit of the granulator, with simultaneous granulation, wherein the teeth have a diameter and a length and are arranged on the shaft, axially offset with respect to each other, along a helical line around the shaft and the maximum peripheral speed of the ends of the teeth is from 1 to 6 m/s and the average residence time for the carbon black in the granulator is from 20 to 600 seconds.

As explained at the beginning, granulators with toothed shafts are used for the wet granulation of carbon black. The peripheral speeds of the ends of the teeth of 10 to 20 m/s and the short residence times of the carbon black in the granulator (of only a few seconds used in this case are very different from the corresponding conditions in dry pelletizing drums.

It has now been found that dry pelleting of carbon black is also possible in toothed shaft granulators. For this purpose, according to the invention, the peripheral speeds at the ends of the teeth must be reduced to values from 1 to 6 m/s and the residence time for carbon black in the granulator must be increased to 20 to 600 seconds, as compared with wet granulation. Under these conditions, stable carbon black granules can be obtained even without the addition of water.

The residence times of the carbon black in the granulator are substantially less than in traditional dry pelletizing processes. The amount throughput m in a granulator is equal to the quotient of the filling amount in the granulator $m_f$ and the average residence time $\bar{t}$ $$m = m_f/\bar{t}.$$

The amount throughput for a granulator, with comparable sizes of pelletizing space, is substantially larger than the amount throughput for a pelletizing drum, or, for the same amount throughput, the pelletizing space required in a granulator is substantially smaller than in a pelletizing drum. The reason for this is the substantially lower residence time for the goods being pelletized in the granulator. It is surprising that carbon blacks can be dry granulated in a granulator, despite the low residence times. Dry granulation is possible by selecting the operating conditions (residence time and peripheral speed of the ends of the teeth), which are unconventional for normal operation of the granulator during wet granulation.

BRIEF DESCRIPTION OF THE DRAWINGS

The present invention will be further understood with reference to the drawings, wherein.

DETAILED DESCRIPTION OF THE INVENTION

The substantial advantage of the new process of the invention is based on the fact that the production output of dry granulated carbon blacks demanded can now be achieved with much smaller plants. Alternatively, the same sized plants can provide a substantially higher production output. The range of variations in peripheral speeds of the ends of the teeth and the average residence times according to the invention can be used to adapt the granulating properties to the product specifications demanded when using different sizes of granulator. By changing the size of the granulator, granulation outputs of more than 2000 kg/h can be obtained while retaining the desired granular properties.

The powdered carbon black is usually fed to the inlet of the granulator with the assistance of a worm conveyer. The carbon black throughput and/or amount throughput of the granulator is then the same as the feeding rate of the worm conveyer and can thus be adjusted between wide limits. The filling amount and the residence time can be extended by raising the exit with respect to the inlet. The angle between the axis of the granulator and the horizontal thereby produced may be altered between roughly 0 and 20°.

The filling amount and residence time are also affected by the speed of rotation of the toothed shaft. When retaining the same carbon black input (constant carbon black throughput), the filling amount and residence time reduce in proportion to each other with increasing speeds of rotation.

Preferred residence times in the process according to the invention are in the range from 20 to 180 seconds. Below 20 seconds the agglomeration process does not advance to a sufficient extent and the granules thus still contain a high proportion of fines, more than 20%. Residence times of more than 600 seconds are usually only possible with, industrially less interesting, low carbon black throughputs due to the restricted upper filling amount.

The smaller filling amounts in granulators, as compared with a pelletizing drum, for the same carbon black throughput, is an advantage. In the event that there is a problem in the granulating process, only correspondingly smaller amounts of carbon black lie outside the specification and have to be disposed of than is the case with a pelletizing drum.

Unwanted deposits of carbon black can appear on the internal wall of the stator during granulation. These deposits involve the risk that individual flakes of carbon black flake away from the wall and the desired dispersible carbon black granules are contaminated with more solid and thus more poorly dispersible flakes of carbon black. In the extreme case, this may even lead to the granules breaking up. The thickness of carbon black deposits on the stator wall should therefore be kept as small as possible or even avoided altogether. A variety of measures are suitable for this purpose.

The possible thickness of carbon black deposits can be minimized, for example, by selecting the length of the teeth in such a way that the clear space between the ends of the teeth and the stator wall is only 0.5 to 3 mm and by axially offsetting the teeth with respect to each other at a distance of less than their diameter so that an unbroken covering of teeth along the axis of the toothed shaft is produced. With this objective, the teeth on the toothed shaft may also be arranged along two or more helical lines.

In addition, the ends of the teeth should not taper to a point or be cut at an angle, as is known for conventional wet granulation. Rather, the end surfaces of the teeth should be formed from flat cut surfaces which are oriented at right angles to the longitudinal extent of the teeth. In this way, the thickness of any carbon black deposits can be kept as small as possible.

As a further measure to avoid or slow down the formation of carbon black deposits on the stator wall, the temperature of the stator may be maintained at a temperature of from 50 to 150° C., preferably from 80 to 120° C. Another advantageous measure is to stimulate vibrations in the stator and the teeth using a vibrator. The frequency and amplitude of the vibrations are then chosen in such a way that carbon black deposits are minimized. Frequencies of from 50 to 300 Hz proved advantageous in the pilot granulator used for tests.

In principle, any type of carbon black can be dry granulated using the process according to the invention. It has been shown that carbon blacks with low specific surface areas and little structure are very easy to granulate. Carbon blacks with a high specific surface area and a more defined structure are easy to granulate. In contrast, carbon blacks with a high specific surface area and little structure and carbon blacks with a low specific surface area and a more defined structure are difficult to granulate. To start agglomeration, therefore, it is expedient to admix carbon black granules with the powdered carbon black, as agglomeration seeds (called seeding material herein). Carbon black granules of the same type of carbon black as it is intended to granulate are preferably used. Depending on the granulating properties of the carbon black, up to 50 wt. % of carbon black granules may be admixed with it. The carbon black granules are preferably used in an amount of 5 to 15 wt. % of the powdered carbon black. In the case of readily granulated types of carbon black, the addition of carbon black granules may be omitted altogether or terminated a short time after the start of granulation.

A further improvement in the granulating effect can be produced when the powdered carbon black is compacted to a compacted bulk density in the range from 150 to 300 g/l before it is fed to the granulator. Precompacting can be performed in a known manner, for example using vacuum filter rolls.

The process according to the invention is not restricted to a specific size of toothed shaft granulator. If the production capacity is intended to be increased by enlarging the granulator, then the process parameters (peripheral speed of the teeth and average residence time in the granulator) must be adjusted within the context of the cited ranges in order to obtain carbon black granules using the larger unit with approximately the same properties as those obtained using the smaller unit. In the examples, a pilot granulator with a stator internal diameter of 20 cm is used. This granulator has a granulating capacity of about 60 kg/h. For large-scale applications, however, granulating capacities of up to 2000 kg/h and more are required. For this type of capacity, the internal diameter of the stator must be increased to about 700 to 800 mm.

Although a very homogeneous and high quality granular material which can be used without further after-treatment is obtained with the process described above, a preferred embodiment of the process provides using the dry granulation process according to the invention as a pregranulation procedure for a conventional dry pelletizing process in a dry pelletizing drum. By connecting the toothed shaft granulator in series before a dry pelletizing drum, the pelletizing capacity can be increased by a factor of 1.5 to 2.5.

In the following the process according to the invention is explained by means of a few examples.

The dry granulation process according to the invention is performed in a granulator with a toothed shaft. The structure of this type of granulator is shown schematically in FIG. 1. The granulator consists of a stationary tube 1 arranged in a horizontal position, the stator, and an axially arranged toothed shaft 2, with the pins 3 arranged in the form of waves, rotating therein. Between the toothed shaft 2 and the stator 1 is the pelletizing space of the granulator. The powdered carbon black is fed to the granulator at inlet 5. In the region of the inlet, a feed screw 6 is located on the toothed shaft which conveys the powdered carbon black in an axial direction towards the exit 7. Stator 1 is designed with a double wall 8, and this allows the stator wall to be kept at a constant temperature using a liquid. Along the stator, on the upper side, are found passage openings, through which one or more spray nozzles 9 for additives may be introduced.

Figure 2:
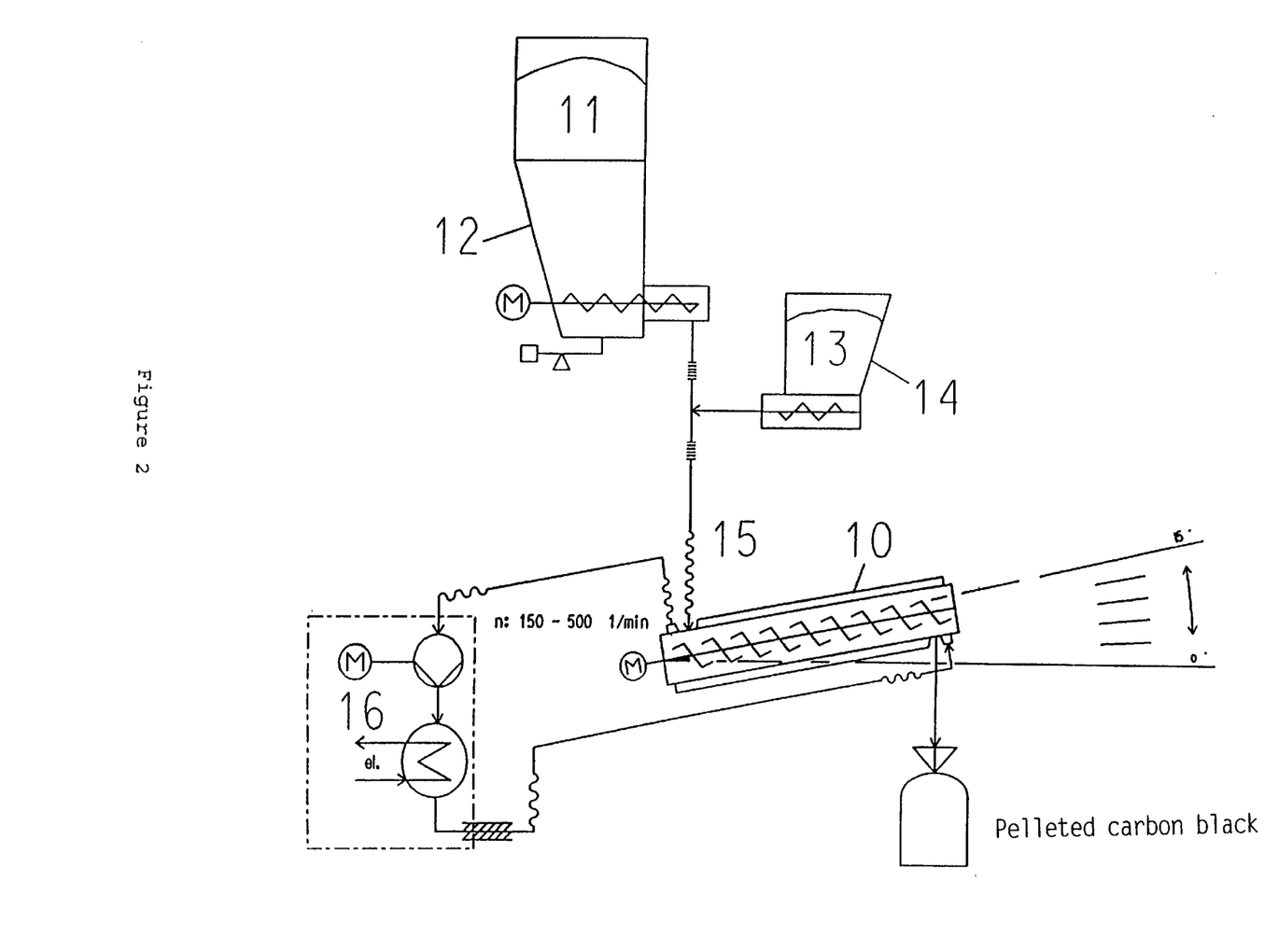
FIG. 2 is a schematic process flow diagram for performing the process according to the invention.

FIG. 2 shows the process flow diagram for dry granulation. The granulator 10 may be inclined with its axis at an angle of inclination of 0 to 20° to the horizontal in order to adjust the residence time. For this purpose, the exit from the granulator is correspondingly raised with respect to the inlet. Powdered carbon black 11 and optionally seeding material 13 are fed to the inlet 15 to granulator 10 from stock containers 12 and 14, respectively. The stator of the granulator is adjusted to the desired temperature using thermostat 16. M is a motor used to operate the equipment as shown.

Figure 3:
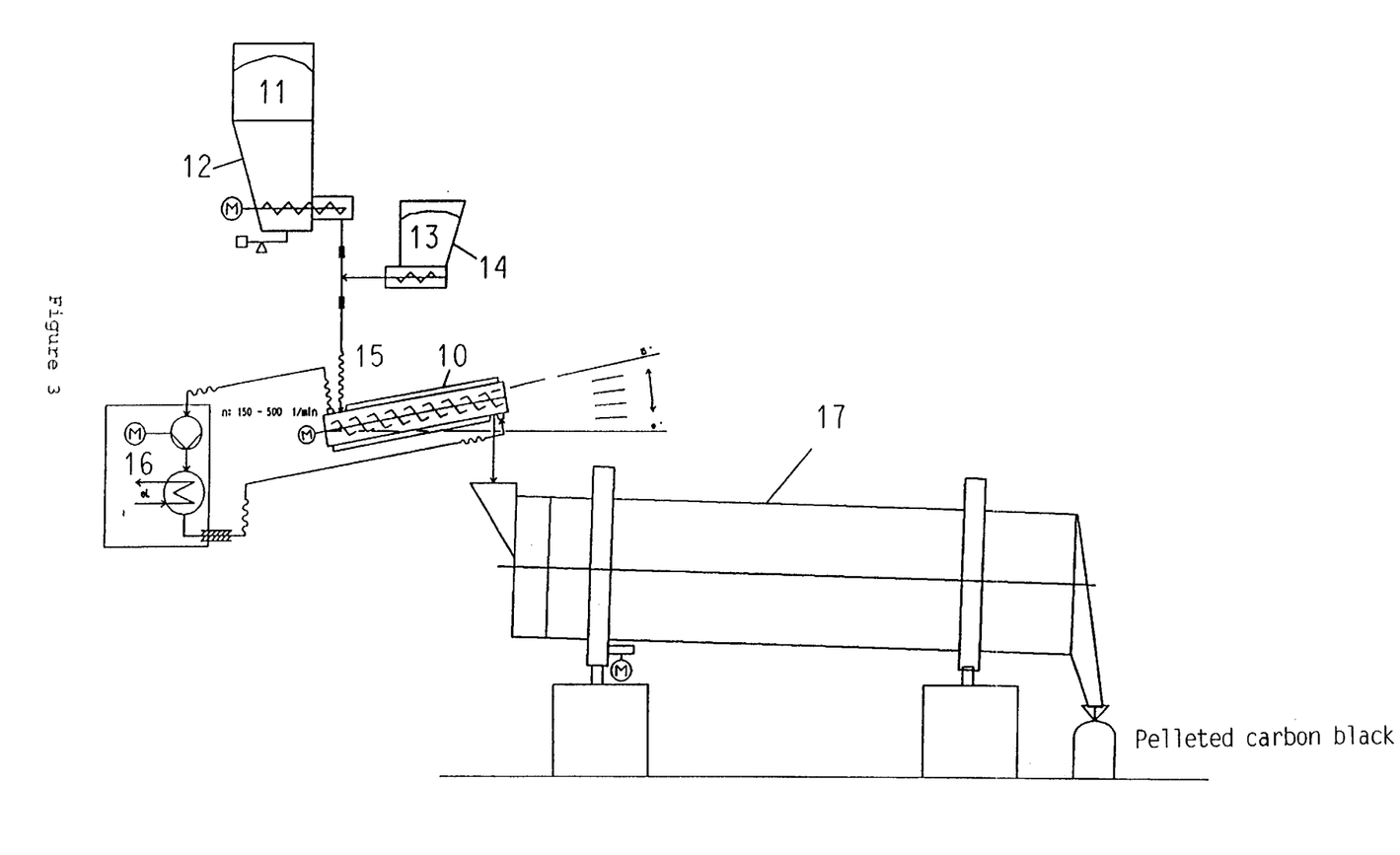
FIG. 3 is a schematic flow diagram of a granulator with dry pelletizing drum connected in series.

FIG. 3 shows the process flow diagram when using the granulator as a pregranulator in front of a pelletizing drum 17.

EXAMPLE 1

Figure 1:
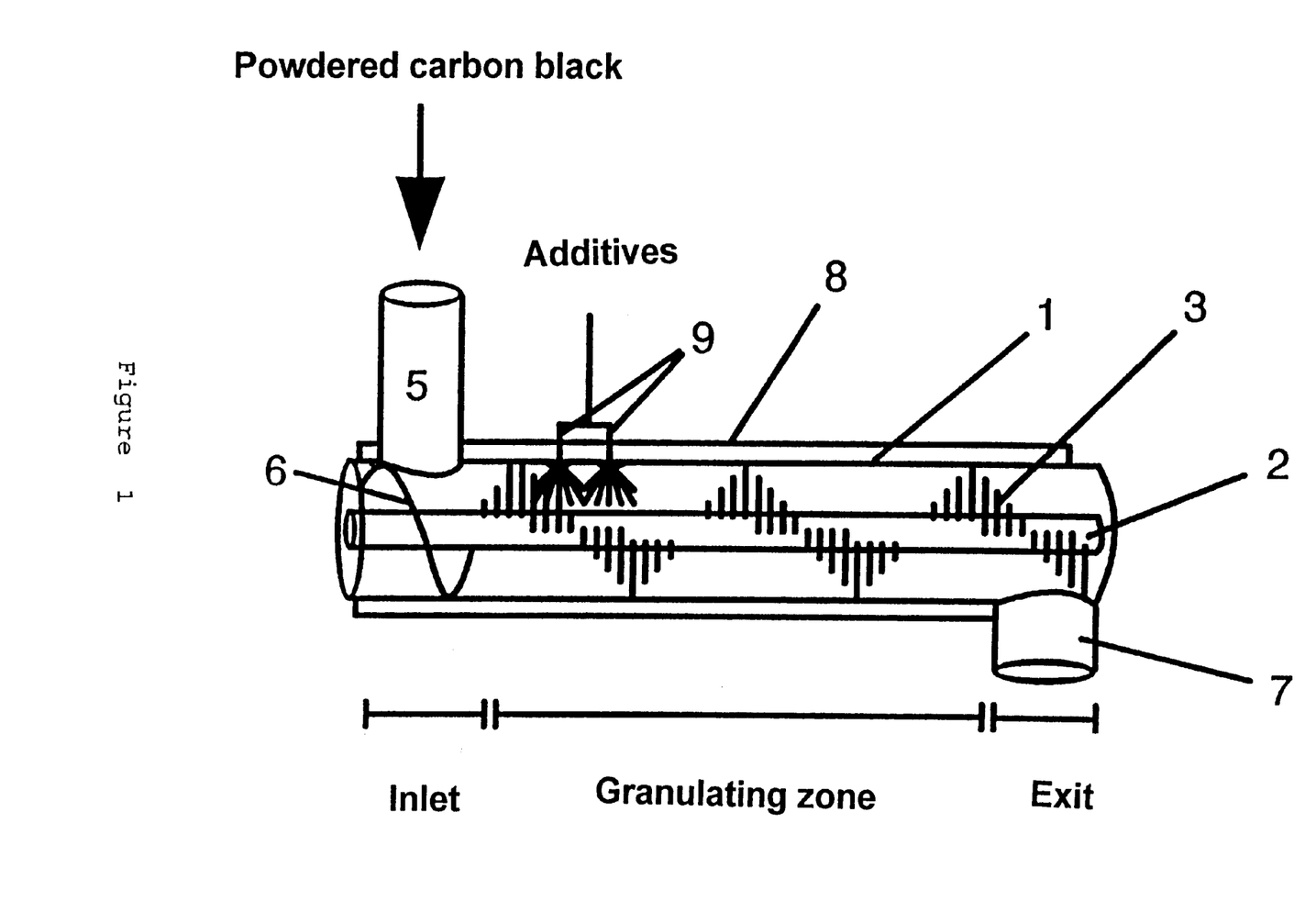
FIG. 1 is a schematic perspective view of a granulator with toothed shaft for performing the process according to the invention.

Using the granulator according to FIG. 1, different types of carbon black were granulated in accordance with the process flow diagram in FIG. 2. The pilot granulator used in all the following examples had a length of 120 cm and an internal stator diameter of 20 cm. The pilot granulator was held at a constant temperature of 100° C. in all the examples. The properties of the dry granulated carbon blacks according to the invention were compared with the properties of conventional carbon blacks, of the same type of carbon black, dry granulated in a pelletizing drum with a diameter of 2.4 m and a length of 18 m, within the scope of daily production. This pelletizing drum had, for example, for carbon black 2 (see Table 1) a carbon black throughput of 1 t/h with an average residence time of 2.5 h. The filling amount for this drum was thus 2.5 tons.

Using the pilot granulator, carbon black throughputs of up to 60 kg/h were produced. A pelletizing drum of the same size, however, is capable of dry granulating only a maximum of 20 kg/h.

The powdered carbon black used for the tests are listed in Table 1, with their properties.

TABLE 1

Analytical Data of the Powdered Carbon Blacks Used (Specifications)

| | BET [m2/g] | DBP [ml/100 g] | 24M4 DBP [ml/100 g] | Compacted Bulk Density [g/l] | |
|---|---|---|---|---|---|
| | | | | non-compacted | compacted |
| CB 1 | 265 | 123 | 105 | 120 | 220 |
| CB 2 | 120 | 106 | 81 | 120 | 190 |
| CB 3 | 80 | 106 | 80 | 160 | 240 |
| CB 4 | 80 | 72 | 65 | 308 | 360 |
| CB 5 | 45 | 46 | 44 | 260 | 450 |
| CB 6 | 90 | 52 | 46 | 172 | 260 |
| CB 7 | 200 | 48 | 40 | 140 | 300 |

CB = carbon black

The analytical data of the powdered carbon blacks were determined in accordance with the following standards:

| BET | DIN 61 132 | |
|---|---|---|
| Iodine number: | DIN 53 582 / | ASTM D-1510 |
| DBP-absorption: | DIN 53 601 / | ASTM D-2414 |
| 24M4 DBP: | | ASTM D-3493 |
| Compacted bulk density | DIN 53 194 | |

The total bead hardness, individual bead hardness, proportion of fines, abrasion, bulk density and bead size distribution of the granulated carbon blacks were determined in accordance with the following standards:

| Total bead hardness: | | ASTM D-1937 |
|---|---|---|
| Individual bead hardness: | DIN 53 603 / | ASTM D-3313 |
| Fines/abrasion: | DIN 53 583 | |
| Bulk density: | DIN 53 600 / | ASTM D-1513 |
| Bead size distribution: | | ASTM D-1511 |

Differently from the DIN standard, the individual bead hardness was also determined on smaller beads with a diameter of 0.5 mm or 0.7 mm. This was necessary because the pelletized material often did not contain a sufficient amount of 1.4 mm beads.

To characterize the bead size distribution, the quantities $d_{50}$ and $d_{80}/d_{20}$ are quoted in the following Tables. These values were determined from the passage summation curves obtained according to ASTM D-1511. $d_{50}$ is thus the theoretical sieve diameter for 50% passage. $d_{80}$ and $d_{20}$ are defined in the same way. The ratio $d_{80}/d_{20}$ is a measure of the distribution width of the bead size distribution curve.

TABLE 2

Results of Granulating Tests

| | | Carbon black 1 | | Carbon black 2 | |
|---|---|---|---|---|---|
| | | Granulator | Drum | Granulator | Drum |
| Carbon black throughput | [kg/h] | 20 | | 40 | |
| Seeding material | [kg/h] | 2 | | 4 | |
| Granulator | | | | | |
| -Speed of rotation | [min⁻¹] | 160 | | 300 | |
| -Peripheral speed | [m/s] | 1.7 | | 3.2 | |
| -Inclination | [degrees] | 10 | | 10 | |
| Analyt. Data | | | | | |
| Iodine value | [mg/g] | 277.6 | 299.2 | 124 | 127 |
| DBP | [ml/100 g] | 122.5 | 117.3 | 106 | 104.8 |
| 24M4DBP | [ml/100 g] | 100 | 97.4 | 81 | 81.3 |
| Prop. of fines: 2 min | [%] | 6.4 | 13 | 8.6 | 12.8 |
| Abrasion | [%] | 11.4 | 4 | 14.6 | 4.6 |
| Total bead hardness | [N] | <2 | 8 | <2 | <2 |
| Ind. bead hardness: 0.5 mm | [N] | 0.014 | 0.014 | 0.007 | 0.011 |
| Bead distribution | | | | | |
| $d_{50}$ | [mm] | 0.8 | 0.35 | 0.43 | 0.43 |
| $d_{80}/d_{20}$ | | 2.3 | 3.1 | 4.2 | 2.1 |
| Bulk density | [g/l] | 249 | 301 | 244 | 311 |

| | | Carbon black 3 | | Carbon black 4 | | Carbon black 5 | |
|---|---|---|---|---|---|---|---|
| | | Granulator | Drum | Granulator | Drum | Granulator | Drum |
| Carbon black throughput | [kg/h] | 40 | | 40 | | 40 | |
| Seeding material | [kg/h] | 4 | | 4 | | 4 | |
| Granulator | | | | | | | |
| -Speed of rotation | [min⁻¹] | 300 | | 300 | | 300 | |
| -Peripheral speed | [m/s] | 3.2 | | 3.2 | | 3.2 | |

TABLE 2-continued

Results of Granulating Tests

| -Inclination | [degrees] | 10 | | 10 | | 10 | |
|---|---|---|---|---|---|---|---|
| Analyt. Data | | | | | | | |
| Iodine value | [mg/g] | 87.5 | 82.3 | 67 | 81.2 | 54.5 | 61.7 |
| DBP | [ml/100 g] | 109 | 98.5 | 73 | 72.1 | 44.3 | 46 |
| 24M4DBP | [ml/100 g] | 80 | 85.6 | 62 | 65.3 | 44.5 | 44.1 |
| Proportion of fines: 2 min | [%] | 2 | 10 | 1.8 | 14.2 | 3.8 | 10.6 |
| Abrasion | [%] | 8.6 | 3 | 10.2 | 4.8 | 1.4 | 4.2 |
| Total bead hardness | [N] | 2 | 2 | — | <2 | 2 | 2 |
| Ind. bead hardness: 0.5 mm | [N] | 0.012 | 0.023 | 0.023 | 0.012 | 0.021 | 0.019 |
| Bead distribution | | | | | | | |
| $d_{50}$ | [mm] | 0.75 | 0.45 | 0.68 | 0.23 | 0.3 | 0.23 |
| $d_{80}/d_{20}$ | | 1.9 | 3.1 | 2.7 | 3.4 | 2.6 | 3.5 |
| Bulk density | [g/l] | 255 | 372 | 369 | 408 | 501 | 511 |

| | | Carbon black 6 | | | Carbon black 7 | | |
|---|---|---|---|---|---|---|---|
| | | Granulator | Granulator | Drum | Granulator | Granulator | Drum |
| Carbon black throughput | [kg/h] | 20 | 20 | | 20 | 30 | |
| Seeding material | [kg/h] | 4 | — | | 20 | 20 | |
| Granulator | | | | | | | |
| -Speed of rotation | [min$^{-1}$] | 300 | 300 | | 300 | 300 | |
| -Peripheral speed | [m/s] | 3.2 | 3.2 | | 3.2 | 3.2 | |
| -Inclination | [degrees] | 10 | 10 | | 10 | 10 | |
| Analyt. Data | | | | | | | |
| Iodine value | [mg/g] | 102.7 | 98.6 | 96.7 | 230.4 | 229.2 | 230.5 |
| DBP | [ml/100 g] | 48 | 50.7 | 52.4 | 47 | 48 | 48.4 |
| 24M4DBP | [ml/100 g] | 46.3 | 46.7 | 51.4 | 39.6 | 39.2 | 44.4 |
| Proportion of fines: 2 min | [%] | 1.6 | 2.6 | 12.4 | 10.8 | 12 | 4.8 |
| Abrasion | [%] | 1.6 | 12.8 | 1.6 | 2.6 | 2 | 3.4 |
| Total bead hardness | [N] | 5 | 6 | 9 | 5 | 3 | 3 |
| Ind. bead hardness: 0.7 mm | [N] | 0.044 | 0.042 | 0.04 | 0.058 | 0.062 | 0.044 |
| Bead distribution | | | | | | | |
| $d_{50}$ | [mm] | 0.5 | 0.95 | 0.35 | 0.35 | 0.53 | 0.66 |
| $d_{80}/d_{20}$ | | 2.1 | 2.1 | 3.8 | 4.2 | 3.2 | 2.5 |
| Bulk density | [g/l] | 414 | 398 | 482 | 454 | 412 | 446 |

EXAMPLE 2

The effect of residence time on the granulation behavior of carbon black 2, which had an average granulation behavior, was tested. For this, the average residence time was adjusted by altering the inclination of the axis of the granulator with respect to the horizontal, while maintaining a constant carbon black throughput. The average residence time was determined from the filling amount and the carbon black throughput. For this, the filling amount established under steady-state conditions was weighed out for each angle of inclination. The variable conditions and analytical data for the granulated carbon black are listed in Table 3.

TABLE 3

Dry Granulation of Carbon Black 2 with Different Residence Times

| | | Carbon black 6 | | | |
|---|---|---|---|---|---|
| | | Granulator | Granulator | Granulator | Granulator |
| Carbon black throughput | [kg/h] | 40 | 40 | 40 | 40 |
| Seeding material | [kg/h] | 8 | 8 | 8 | 8 |
| Granulator | | | | | |
| -Speed of rotation | [min$^{-1}$] | 350 | 350 | 350 | 350 |
| -Peripheral speed | [m/s] | 3.7 | 3.7 | 3.7 | 3.7 |
| -Inclination | [degrees] | 0 | 5 | 10 | 15 |
| Residence time | [s] | 24.7 | 70.7 | 75.8 | 106 |

TABLE 3-continued

Dry Granulation of Carbon Black 2 with Different Residence Times

|  |  | Carbon black 6 | | | |
|---|---|---|---|---|---|
|  |  | Granulator | Granulator | Granulator | Granulator |
| Analyt. Data |  |  |  |  |  |
| Iodine value | [mg/g] | 119.5 | 118.9 | 119.7 | 120.0 |
| DBP | [ml/100 g] | 98.1 | 96.9 | 99.4 | 98.4 |
| Proportion of fines: 2 min | [%] | 20.4 | 13.4 | 8.4 | 7.0 |
| Abrasion | [%] | 14 | 14.4 | 8.8 | 2.4 |
| Total bead hardness | [N] | <2 | <2 | <2 | <2 |
| Ind. bead hardness: 0.7 mm | [N] | 0.025 | 0.025 | 0.017 | 0.019 |
| Bead distribution |  |  |  |  |  |
| $d_{50}$ | [min] | 0.36 | 0.54 | 0.6 | 0.7 |
| $d_{80}/d_{20}$ |  | 8.5 | 3.9 | 4.6 | 3 |
| Bulk density | [g/l] | 267 | 272 | 270 | 273 |

EXAMPLE 3

Carbon black 2 was used in order to determine the optimum amount of granulated carbon black to add as seeding material. The amount of seeding material was varied from 10 to 50%. The variable conditions and analytical data are summarized in Table 4. With increasing amounts of seeding material, the proportion of fines and abrasion initially decreases but then passes through a minimum at an amount of seeding material of 30 wt. % and then increases again. The bead size distribution is much narrower with higher amounts of seeding material. The bulk density increases slightly. The bead hardness is barely affected at all by the amount of seeding material.

The optimum amount of seeding material to add depends on the type of carbon black being granulated. It has to be determined separately for each type of carbon black.

EXAMPLE 4

In a further set of tests, carbon black 2 was granulated with the toothed shaft rotating at different speeds, that is to say with different peripheral speeds at the ends of the teeth. The speed was varied from 150 $min^{-1}$ to 500 $min^{-1}$. The variable conditions and analytical data are summarized in Table 5. With increasing speed, the proportion of fines and abrasion initially decreases and passes through a minimum at 400 $min^{-1}$, but then increases again. At 500 $min^{-1}$, considerable breakdown of the beads takes place. The width of the bead size distribution ($d_{80}/d_{20}$) shows the same behavior, with a minimum at 400 $min^{-1}$.

TABLE 4

Varying the Amount of Seeding Material When Dry Granulating Carbon Black 2

| Carbon black throughput | [kg/h] | 40 | 40 | 40 | 40 | 40 |
|---|---|---|---|---|---|---|
| Seeding material | [kg/h] | 4 | 8 | 12 | 16 | 20 |
| Granulator |  |  |  |  |  |  |
| -Speed of rotation | [$min^{-1}$] | 300 | 300 | 300 | 300 | 300 |
| -Peripheral speed | [m/s] | 3.2 | 3.2 | 3.2 | 3.2 | 3.2 |
| -Inclination | [Degrees] | 10 | 10 | 10 | 10 | 10 |
| Analyt. Data |  |  |  |  |  |  |
| Iodine value | [mg/g] | 122.6 | 121.3 | 121.3 | 122.6 | 121.3 |
| DBP | [ml/100 g] | 106 | 104 | 102.5 | 104.5 | 106 |
| 24M4DBP | [ml/100 g] | — | — | — | — | 1.8 |
| Prop. of fines: 2 min | [%] | 5.6 | 3 | 1.4 | 1.6 | 23.2 |
| Abrasion | [%] | 24.8 | 17.6 | 16.3 | 27.4 | <2 |
| Total bead hardness | [N] | <2 | <2 | <2 | <2 |  |
| Ind. bead hardn. 0.7 mm | [N] | 0.014 | 0.014 | 0.015 | 0.014 | 0.015 |
| Bead distribution |  |  |  |  |  |  |
| $d_{50}$ | [mm] | 1.3 | 0.8 | 1.08 | 0.8 | 0.85 |
| $d_{80}/d_{20}$ |  | 2.0 | 2.1 | 2.1 | 1.5 | 1.5 |
| Bulk density | [g/l] | 224 | 232 | 236 | 244 | 236 |

TABLE 5

Varying the Speed of Rotation of the Toothed Shaft When Dry Granulating Carbon Back 2

| Carbon black throughput | [kg/h] | 40 | 40 | 40 | 40 | 40 | 40 |
|---|---|---|---|---|---|---|---|
| Seeding material | [kg/h] | 8 | 8 | 8 | 8 | 8 | 8 |
| Granulator | | | | | | | |
| -Speed of rotation | [min$^{-1}$] | 150 | 250 | 350 | 400 | 450 | 500 |
| -Peripheral speed | [m/s] | 1.6 | 2.7 | 3.7 | 4.2 | 4.8 | 5.3 |
| -Inclination | [Degrees] | 10 | 10 | 10 | 10 | 10 | 10 |
| -Residence time | [s] | | | 75.8 | | | |
| Analyt. Data | | | | | | | |
| Iodine value | [mg/g] | 121.3 | 122.6 | 122.6 | 122.6 | 122.6 | 122.6 |
| DBP | [ml/100 g] | 104 | 104 | 103.5 | 105.5 | 104 | 105 |
| 24M4DBP | [ml/100 g] | — | — | — | — | — | — |
| Proportion of fines: 2 min | [%] | 16 | 12.6 | 4.8 | 2.8 | 9 | 15.4 |
| Abrasion | [%] | 38.4 | 34 | 13.4 | 10.2 | 12.6 | 9.4 |
| Total bead hardness | [N] | <2 | <2 | <2 | <2 | <2 | <2 |
| Ind. bead hardness | [N] | 0.016 | 0.01 | 0.012 | 0.014 | 0.015 | 0.013 |
| Bead distribution | | | | | | | |
| $d_{50}$ | [mm] | 0.85 | 1.07 | 0.55 | 0.56 | 0.42 | 0.42 |
| $d_{80}/d_{20}$ | | 8.5 | 4.4 | 2.1 | 1.8 | 2.9 | 4.7 |
| Bulk density | [g/l] | 253 | 232 | 224 | 224 | 236 | 236 |

EXAMPLE 5

In a further set of tests, the effect of carbon black throughput on the granulation behavior of carbon black 2 was tested. The carbon black throughput was varied from 10 to 60 kg/h. The variable conditions and analytical data are summarized in Table 6. The proportion of fines varies between 1.4 and 3.2%, independently of the throughput. The abrasion decreases with increasing throughput.

TABLE 6

Varying the Carbon Black Throughput When Dry Granulating Carbon Black 2

| Carbon black throughput | [kg/h] | 10 | 20 | 30 | 40 | 50 | 60 |
|---|---|---|---|---|---|---|---|
| Seeding material | [kg/h] | 2 | 4 | 6 | 8 | 10 | 12 |
| Granulator | | | | | | | |
| -Speed of rotation | [min$^{-1}$] | 300 | 300 | 300 | 300 | 300 | 300 |
| -Peripheral speed | [m/s] | 3.2 | 3.2 | 3.2 | 3.2 | 3.2 | 3.2 |
| -Inclination | [Degrees] | 10 | 10 | 10 | 10 | 10 | 10 |
| Analyt. Data | | | | | | | |
| Iodine value | [mg/g] | 122.6 | 122.6 | 123.8 | 121.3 | 122.6 | 122.6 |
| DBP | [ml/100 g] | 104 | 104.5 | 106 | 104 | 106 | 104 |
| 24M4DBP | [ml/100 g] | — | — | — | — | — | — |
| Proportion of fines: 2 min | [%] | 2.4 | 3.2 | 1.4 | 3 | 1.6 | 2.8 |
| Abrasion | [%] | 21.8 | 23.4 | 22.2 | 17.6 | 17.6 | 15.6 |
| Total bead hardness | [N] | <2 | <2 | <2 | <2 | <2 | <2 |
| Ind. bead hardness | [N] | 0.017 | 0.015 | 0.013 | 0.014 | 0.011 | 0.015 |
| Bead distribution | | | | | | | |
| $d_{50}$ | [mm] | 0.8 | 1.0 | 0.68 | 0.6 | 0.55 | 0.5 |
| $d_{80}/d_{20}$ | | 2.0 | 2.0 | 1.7 | 2.1 | 1.9 | 2.2 |
| Bulk density | [g/l] | 264 | 240 | 236 | 232 | 248 | 24 |

EXAMPLE 6

The granulator was used as a pregranulator in front of a conventional pelletizing drum in accordance with FIG. 3 in order to granulate carbon black 6. The pelletizing drum had a diameter of 0.6 m and a length of 4.0 m. When operating in the conventional manner, this pelletizing drum had a capacity of 30–50 kg/h of carbon black. By connecting the granulator in series as shown, the capacity could be approximately increased by a factor of 2. The throughput was increased in 20 kg/h steps, starting at 10 kg/h. When the pelletizing drum was supplied directly with powdered carbon black, granulation was still possible up to a throughput of 30 kg/h. At 50 kg/h the beads broke up. Using a pregranulated material, a throughput of 70 kg/h could be achieved. To pregranulate carbon black 6, the granulator was operated in the same way as in example 1 with a carbon black throughput of 40 kg/h and an amount of seeding material of 11 kg/h. The speed of rotation of the toothed shaft was 350 min$^{-1}$. The variable conditions in the pelletizing drum and the analytical data for the granulated carbon black are summarized in Tables 7 and 8.

Further variations and modifications of the foregoing will be apparent to those skilled in the art and are intended to be encompassed by the claims appended hereto.

German priority application 196 23 198.1 is relied on and incorporated herein by reference.

TABLE 7

Varying the Throughput When Dry Granulating in a 4 m Pelletizing Drum
Starting Material: Powder; Carbon Black 6;
Compacted Bulk Density of Powdered Carbon Black: 194 g/l

| Carbon black throughput Pelletizing drum | [kg/h] | 10 | 30 | 50 |
|---|---|---|---|---|
| Speed of rotation Analyt. Data | [min$^{-1}$] | 30 | 30 | 30 |
| Iodine value | [mg/g] | 95 | 95 | 98.8 |
| DBP | [ml/100 g] | 51.3 | 50.7 | 53.0 |
| Proportion of fines: 2 min | [%] | 17.6 | 13.6 | n.m.* |
| Abrasion | [%] | 10.8 | 5 | n.m. |
| Total bead hardness | [N] | 3 | 8 | n.m. |
| Ind. bead hardness: 0.7 mm | [N] | 0.073 | 0.033 | n.m. |
| Bead distribution | | | | |
| $d_{50}$ | [mm] | 0.28 | 0.17 | |
| $d_{80}/d_{20}$ | | 4.4 | 2.3 | |
| Bulk density | [g/l] | 467 | 476 | 206 |

*n.m. = no measurement, because pellet formation failed

TABLE 8

Varying the Throughput When Dry Granulating in a 4 m Pelletizing drum
Starting Material: Pregranules; Carbon Black 6;
Compacted Bulk Density of Pregranules: 373 g/l

| Carbon black throughput Pelletizing drum | [kg/h] | 10 | 30 | 50 | 70 |
|---|---|---|---|---|---|
| -Speed of rotation Analyt. Data | [min$^{-1}$] | 30 | 30 | 30 | 30 |
| Iodine value | [mg/g] | 96.3 | 96.3 | 96.3 | 99.6 |
| DBP | [ml/100 g] | 52.3 | 50.7 | 50.7 | 52.0 |
| Proportion of fines: 2 min | [%] | 12 | 1.4 | 2.8 | 2.4 |
| Abrasion | [%] | 2.6 | 5.0 | 2.4 | 6.4 |
| Total bead hardness | [N] | 8 | 8 | 7 | 4 |
| Ind. bead hardness: 0.7 mm | [N] | 0.048 | 0.057 | 0.05 | 0.042 |
| Bead distribution | | | | | |
| $d_{50}$ | [mm] | 0.25 | 0.76 | 0.4 | 0.5 |
| $d_{80}/d_{20}$ | | 3.2 | 2.3 | 3.1 | 2.1 |
| Bulk density | [g/l] | 480 | 456 | 480 | 428 |

We claim:

1. A process for the manufacture of granulated carbon black with a weight mean bead diameter of from 0.125 to 2 mm by continuous dry granulation of powdered carbon black, comprising:

introducing powdered carbon black into a toothed shaft granulator having an inlet and an exit and a circular cylindrical, drum-shaped stator with a longitudinal axis defining a stator wall, an axially arranged toothed shaft with a plurality of pins which rotates about the longitudinal axis of the stator and conveys the powdered carbon black from the inlet to the exit of the granulator, and simultaneously granulates said carbon black without the presence of water, wherein the pins have a diameter and a length and are arranged on the shaft, axially offset with respect to each other, along a helical line around the shaft and rotating said shaft at peripheral speed of the ends of the pins from 1 to 6 m/s and an average residence time for the carbon black in the granulator from 20 to 600 seconds, wherein the powdered carbon black is precompacted to a compacted bulk density of about 150 to 300 g/l prior to being granulated.

2. The process according to claim 1, wherein the axial shift between neighboring pins is less than their diameter so that complete covering is provided by the pins along the axis and the length of the pins is selected so that the clear space between the ends of the pins and the stator wall is 0.5 to 3 mm during granulation.

3. The process according to claim 1, wherein the pins are arranged on the shaft along two or more helical lines.

4. The process according to claim 1, wherein the stator is maintained at a temperature in the range of about 50 to 150° C.

5. The process according to claim 1, wherein the stator is maintained at a temperature in the range of about 80 to 120° C.

6. The process according to claim 1, wherein the stator and pins in the toothed shaft granulator are stimulated to vibrate in the frequency range of about 50 to 300 Hz.

7. The process according to claim 1, wherein the residence time for carbon black in the granulator is changed by raising the exit with respect to the inlet, wherein the angle between the longitudinal axis of the granulator and the horizontal can range from 0 to about 20°.

8. The process according to claim 1, wherein up to about 50 wt. % of granulated carbon black is admixed with the powdered carbon black as seeding material.

9. The process according to claim 1, wherein about 5 to 30 wt. % of granulated carbon black is admixed with the powdered carbon black as seeding material.

10. A process, wherein after the powdered carbon black has been granulated according to the process of claim 1, said granulated carbon black is subjected to an additional dry pelletizing drum to produce a pelletized carbon black.

* * * * *